(No Model.)
C. H. SCHEERMESSER.
CHECKREIN HOLDER.
No. 582,134. Patented May 4, 1897.
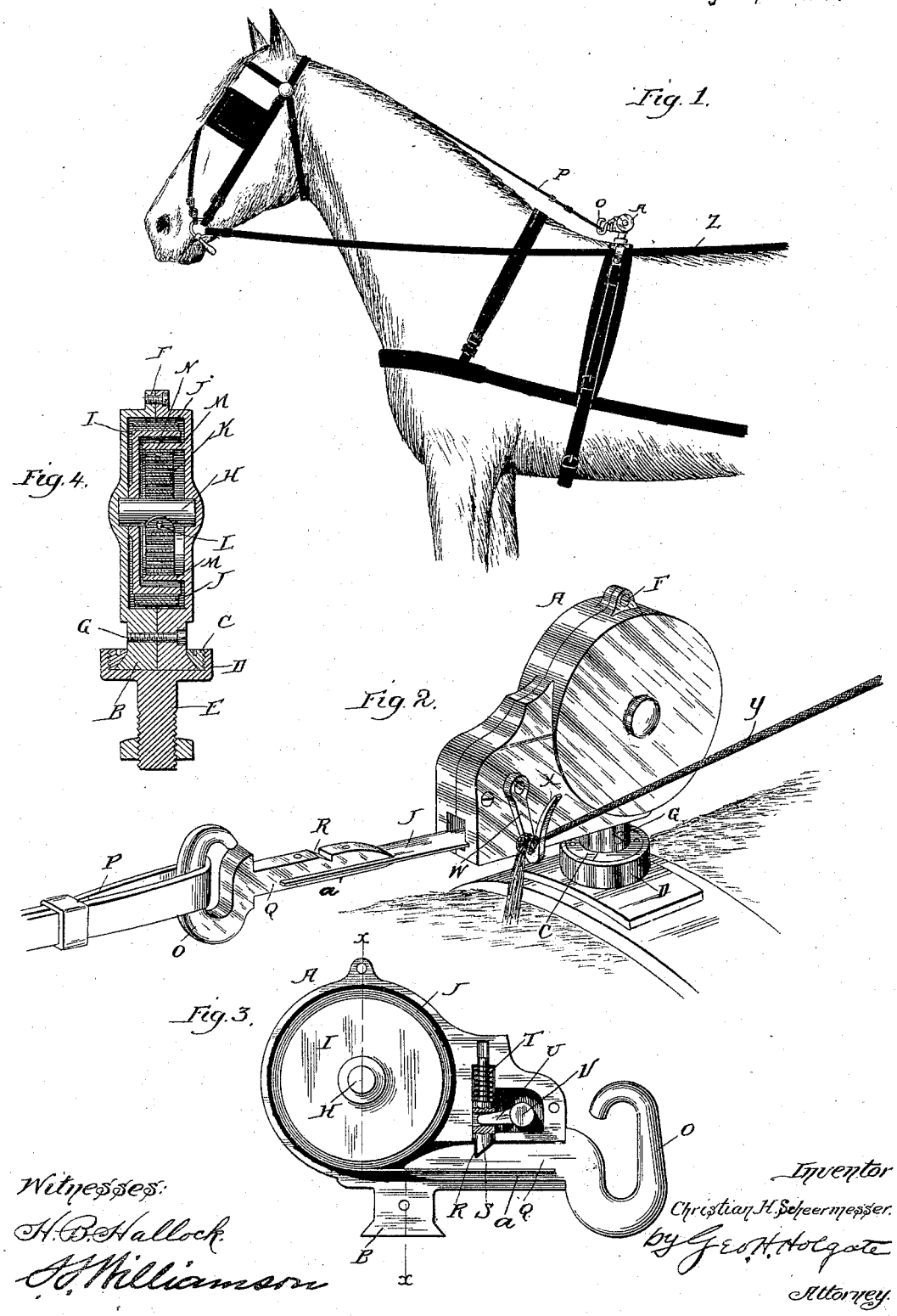

UNITED STATES PATENT OFFICE.

CHRISTIAN H. SCHEERMESSER, OF REYNOLDTON, PENNSYLVANIA.

CHECKREIN-HOLDER.

SPECIFICATION forming part of Letters Patent No. 582,134, dated May 4, 1897.

Application filed August 22, 1896. Serial No. 603,585. (No model.)

*To all whom it may concern:*

Be it known that I, CHRISTIAN H. SCHEERMESSER, a citizen of the United States, residing at Reynoldton, in the county of Allegheny and State of Pennsylvania, have invented certain new and useful Improvements in Checkrein-Holders, of which the following is a specification.

This invention relates to a new and useful improvement in checkrein-holders, and has for its object to provide a device of this description by means of which a horse may be reined up or unreined without the necessity of the driver dismounting for this purpose.

With these ends in view this invention consists in the details of construction and combination of elements hereinafter set forth, and then specifically designated by the claims.

In order that those skilled in the art to which this invention appertains may understand how to make and use the same, its construction and operation will now be described in detail, referring to the accompanying drawings, forming a part of this specification, in which—

Figure 1 represents a horse having my improvement applied to the harness thereon; Fig. 2, a perspective of my improvement, showing the method of releasing the hook and permitting it to be drawn out; Fig. 3, an elevation of one-half of the casing, showing the mechanism therein; and Fig. 4, a section at the line *x x* of Fig. 3.

In carrying out this invention I provide a casing A, which is made in two sections and preferably cast in shape, having the shanks B projecting downward therefrom, which are flared outward, so that the split nut C when surrounding said shanks will hold them together and preventing upward withdrawal from the socket D. This socket is formed upon the screw-bolt E and provided with internal threads for the reception of the nut, so that the casing may be attached to this bolt by the placing of the shanks B within the socket and running the split nut C into engagement with the threads of said socket, as clearly shown in Fig. 4. This arrangement will permit the casing to turn upon the axis of the shanks after the manner of a swivel. The two sections of casing are secured together by the screws F and G, the former passing through suitable lugs formed on the sections and the latter through the shanks.

An axle H is journaled within the casing by its ends being fitted within suitable recesses formed therein, and upon this axle is rigidly mounted the drum I, upon which is coiled the strap J. The inner end of the coil-spring K is attached at L to the axle and the outer end thereof to the flange M at N, and since this flange is formed with one of the sections of the casing it will be seen that when the drum is revolved by the uncoiling of the strap the spring will be wound so that when the strap is released it will again be coiled upon the drum by the action of said spring for the purpose hereinafter set forth.

The checkrein-hook O may be of any suitable design for the retention of the checkrein P, and this hook has formed therewith a shank Q, to which the steel tape J is secured in any convenient manner, such as by riveting, between said shank and a strip A, either loose or formed with the shank; and a notch R is formed in the shank for the reception of the dog S, the latter being actuated in one direction by the spring T and in the opposite direction by the finger U, carried by the revolving stud V.

A lever W is secured to one end of the stud outside of the casing and is provided with a V-shaped hook X, into which the end of the whip Y may be thrust for the operation of said lever, and, as shown in Fig. 2, the knotted end of said whip will prevent the withdrawal thereof when pulling thereon, and when the lever W is drawn toward the driver the nose of the dog S will be lifted out of engagement with the notch R, thus permitting the hook O to be drawn forward against the action of the coil-spring by the horse's head, so that in operation it is only necessary for the driver to thrust the end of his whip within the V-shaped hook and pull thereon, when the horse will be free to draw the checkrein forward, so as to lower his head for drinking or eating purposes, and when it is again desired to rein up the horse's head the lines Z are drawn upon, so as to bring the head to the desired position, when the tape will be coiled upon the drum by the action of the spring, thereby drawing the shank of the hook into the casing and permitting the nose of the dog to engage with the notch R, after which the horse cannot again pull the hook forward until the lever W has been operated, as before described. When the tape is drawn out, it is prevented from injury by the ready swivel movements of the casing which will follow the turning of the horse's head in any direction.

By the use of my improvement the inconvenience of dismounting, which has heretofore been occasioned when it became necessary to unrein the horse to permit him to drink, is obviated and the driver given perfect control over the reining or unreining of the horse without leaving the carriage.

I do not wish to be limited to the exact construction here shown, as the design of my improvement may be varied without departing from the spirit of my invention.

Having thus fully described this invention, what is claimed as new and useful is—

1. In a checkrein-holder a casing formed in two sections, shanks projecting downward from said sections, said shanks being flared at their bottoms, a split nut adapted to fit around said flared portion, a socket for the reception of said nut and a bolt formed on said socket, as and for the purpose described.

2. In a checkrein-holder, a socket having a shank secured to the harness-saddle, a casing swiveled in said socket, a spring-actuated drum mounted in said casing, a strap wound on said drum, a hook secured to the outer end of the strap, and a spring-pressed dog engaging said hook, as and for the purpose described.

In testimony whereof I have hereunto affixed my signature in the presence of two subscribing witnesses.

CHRISTIAN H. SCHEERMESSER.

Witnesses:
S. S. WILLIAMSON,
GEO. M. MCCLEARY.